US009652838B1

(12) United States Patent
Manmatha et al.

(10) Patent No.: US 9,652,838 B1
(45) Date of Patent: May 16, 2017

(54) OBJECT RETRIEVAL

(71) Applicant: A9.com, Inc., Palo Alto, CA (US)

(72) Inventors: Raghavan Manmatha, San Francisco, CA (US); Wei-Hong Chuang, Burlingame, CA (US)

(73) Assignee: A9.com, Inc., Palo Alto, CA (US)

( * ) Notice: Subject to any disclaimer, the term of this patent is extended or adjusted under 35 U.S.C. 154(b) by 102 days.

(21) Appl. No.: 14/581,906

(22) Filed: Dec. 23, 2014

(51) Int. Cl.
*G06K 9/00* (2006.01)
*G06T 7/00* (2017.01)
*G06K 9/46* (2006.01)
*G06K 9/62* (2006.01)
*G06F 17/30* (2006.01)

(52) U.S. Cl.
CPC ...... *G06T 7/0004* (2013.01); *G06F 17/30247* (2013.01); *G06K 9/4604* (2013.01); *G06K 9/6202* (2013.01)

(58) Field of Classification Search
None
See application file for complete search history.

(56) References Cited

U.S. PATENT DOCUMENTS

| 7,657,100 | B2 * | 2/2010 | Gokturk | G06F 17/30256 382/209 |
| 8,463,036 | B1 * | 6/2013 | Ramesh | G06K 9/4642 382/170 |
| 9,171,195 | B1 * | 10/2015 | Rybakov | G06K 9/00201 |
| 2009/0051545 | A1 * | 2/2009 | Koblasz | G08B 21/245 340/573.1 |
| 2013/0258117 | A1 * | 10/2013 | Penov | G06K 9/6202 348/207.1 |
| 2015/0114763 | A1 * | 4/2015 | Kim | B66B 5/0012 187/392 |

FOREIGN PATENT DOCUMENTS

JP 2006023960 A * 1/2006

OTHER PUBLICATIONS

Chen, Huizhong, et al. "Robust text detection in natural images with edge-enhanced maximally stable extremal regions." Image Processing (ICIP), 2011 18th IEEE International Conference on. IEEE, 2011. 4 pages.*
Geradts, Zeno, and Jan Keijzer. "The image-database REBEZO for shoeprints with developments on automatic classification of shoe outsole designs." Forensic Science International 82.1 (1996): 21-31. 11 pages.*

* cited by examiner

*Primary Examiner* — Sumati Lefkowitz
*Assistant Examiner* — Ryan P Potts
(74) *Attorney, Agent, or Firm* — Hogan Lovells US LLP

(57) ABSTRACT

Various approaches enable a user to capture image information (e.g., still images or video) about an object of interest such as the sole of a shoe or other piece of footwear (e.g., a sandal) and receive information about items that are determined to match footwear based at least in part on the image information. For example, an image analyze service or other similar service can analyze the images to determine a type of shoe included within the images based at least in part on patterns of other distinguishing features of the sole of the shoe. The image analysis service can aggregate the results and can provide information about the results as a set of matches or results to be displayed to a user in response to a visual search query. The information can include, for example, descriptions, contact information, availability, location data, pricing information, and other such information.

20 Claims, 11 Drawing Sheets

OBJECT RETRIEVAL

BACKGROUND

Users are increasingly utilizing electronic devices to obtain various types of information. For example, a user wanting to obtain information about an object can capture an image of the object and upload that image to an identification service for analysis. In certain situations, the object represented in the image will be compared against a set of images including views of objects from a particular orientation. While some objects are relatively easy to match, other objects are not as straightforward. For example, an object such as a pair of boots might be imaged from several different orientations, with many of those orientations not matching the orientation of the stored image for that type or style of boot. These differences in orientation, size, and shape, among other such differences, can prevent accurate matches from being found for various images captured by a user. Conventional approaches typically require the user to be able to identify the item or know relevant information about the item, and then perform a search for the item based on the identity or the relevant information for the item. If the user incorrectly identifies the item or if the user does not know sufficient information about the item, then the search cannot be performed appropriately. Moreover, conventional approaches typically require the user to manually input the identity or the relevant information for item into the computing device for the device to perform the search. These and other concerns can reduce the overall user experience associated with using computing devices to obtain information about items

BRIEF DESCRIPTION OF THE DRAWINGS

Various embodiments in accordance with the present disclosure will be described with reference to the drawings, in which.

DETAILED DESCRIPTION

Figure 1A:
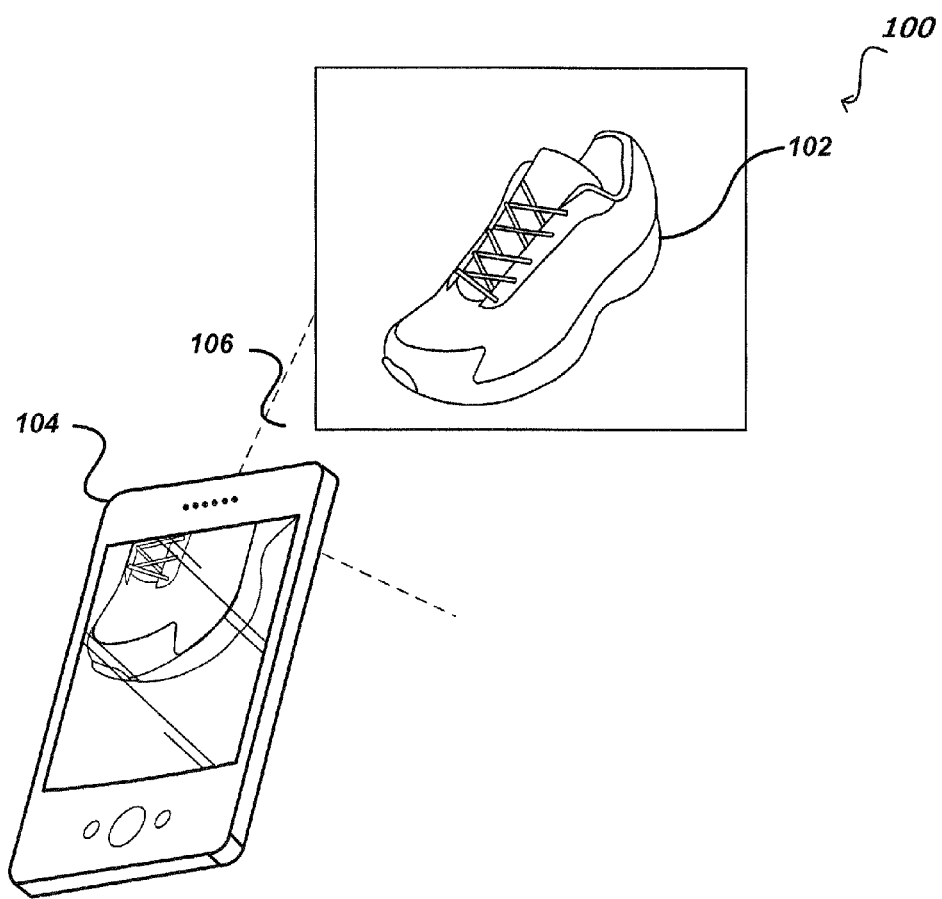
FIGS. 1A, 1B, 1C, 1D, 1E and 1F, illustrate example images of objects that can be captured and analyzed in accordance with various embodiments.

Systems and methods in accordance with various embodiments of the present disclosure may overcome one or more of the aforementioned and other deficiencies experienced in conventional approaches to identifying various types of items using an electronic device. In particular, various embodiments enable a user to capture image information (e.g., still images or video) about an object of interest such as a shoe or other piece of footwear (e.g., a sandal) and receive information about items that are determined to match the item of interest based at least in part on the image information.

For example, in at least some embodiments, an electronic device (e.g., a mobile phone, a tablet computer, etc.) can communicate with at least one image analysis service in order to attempt to identify items in the captured image information (although in some embodiments at least a portion of the matching can be done on the computing device itself). The device can capture one or more images, such as image frames for a live video feed of an object such a shoe or other object, and can upload, stream, or otherwise transfer the image information (e.g., the captured image or data resulting from processing the image), either automatically or in response to user action, which can direct at least a portion of the image information to one or more image analysis services (or devices, or modules, etc.). An image analysis service can include one or more algorithms for matching image information stored for a variety of objects.

The image analyze service can, for example, analyze the images to determine a type of shoe (and in various embodiments a type of object) represented within the images based at least in part on patterns of other distinguishing features of a sole of the shoe. The type of shoe can include, for example, a shoe brand and model of shoe of that brand. Determining the type of shoe can be based on other features as well, such as text, characters, symbols, logos, etc. represented in the images. Analyzing the images can include, for example, identifying a plurality of feature points corresponding to pattern or other distinguishing features, and based at least in part on the feature points, one or more feature descriptors representative of the object can be generated. The identified feature descriptors can be compared to stored feature descriptors that correspond to a shoe and information associated with the shoe.

The image analysis service can aggregate the results from the image analysis service(s), and can provide information about the results as a set of matches or results to be displayed to a user in response to a visual search query. The image analysis service can also utilize one or more information aggregators or other such services that are capable of obtaining additional information for each of the results and provide that information to the user. The additional information can include, for example, descriptions, contact information, availability, location data, pricing information, and other such information.

Other variations, functions, and advantages are described and suggested below as may be provided in accordance with the various embodiments.

Figure 1B:
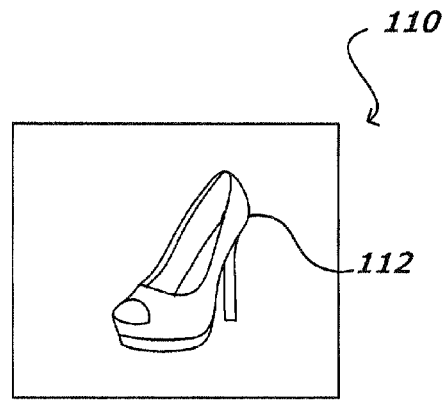

As described, users of computing devices (e.g., mobile phones, tablet computers, etc.) desire to point their device at an object and retrieve relevant information (e.g., pricing information, user reviews, links to purchase the object, etc.) associated with the object. FIGS. 1A, 1B, 1C, 1D, and 1E illustrate example images of objects that can be captured and analyzed to retrieve relevant information in accordance with various embodiments. FIG. 1A illustrates an example image 100 of a shoe 102 that can be captured and utilized in accordance with various embodiments. In this example, a user is interested in obtaining information about the shoe. The shoe is shown with a particular orientation, as may be used by an electronic retailer or other such provider to display objects in an electronic marketplace. Such an orientation also can be used for matching, as the perspective view provides information about the general shape of the object, and shows the side and tongue of the shoe, which are likely places for any logo or distinctive markings. Using an appropriate application executing on a computing device 104, the user is able to obtain an image of the shoe by positioning the computing device such that the shoe is within a field of view 106 of at least one camera of the computing device. FIG. 1B illustrates another example image 110 showing a different shoe with substantially the same orientation. An image, feature, contour, or other such matching algorithm can analyze such an image and determine with relative certainty that shoes 102, 112 in the two images 100, 110 are not the same.

For example, an image analysis service could obtain and analyze multiple images of the shoe to be matched, which could include images taken from the top, bottom, each side, and various angles with respect to an object, as well as differently shaped states of the object (where possible). However, such an approach can greatly increase the amount of image processing, data storage, and image comparison that must be performed, and can be very time consuming, such that the approach can be at least impractical for many providers.

In other instances, the image analysis service could attempt to analyze at least a portion of the image to determine a match to a corresponding shoe. In this situation, the portion of the image to be analyzed can be indicated manually, such as by a user pointing to the shoe on the screen or drawing a bounding box around the shoe. In other embodiments, one or more image analysis algorithms can attempt to automatically locate one or more objects in an image. In some embodiments, a user can manually cause the image to be analyzed, while in other embodiments the image can be analyzed automatically, either on the device or by transferring image information to a remote system or image analysis service as discussed later herein. Analyzing the image can include comparing the image to one or more images stored in an image database. However, various complications can arise, when users capture images from different orientations.

Figure 1C:
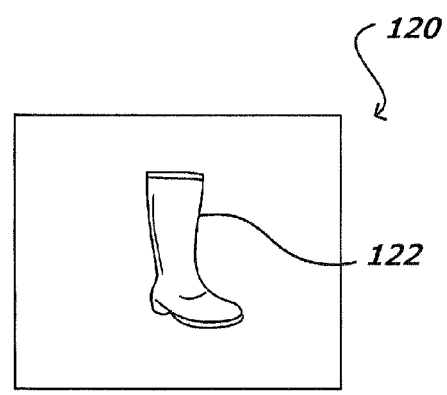
Figure 1D:
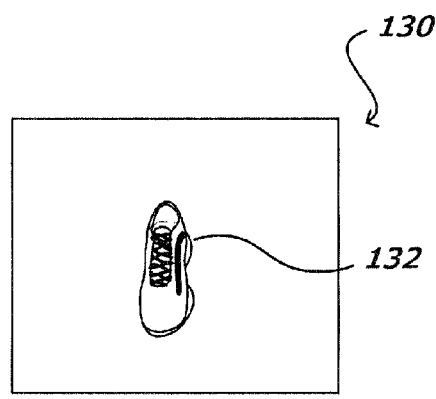
Figure 1E:
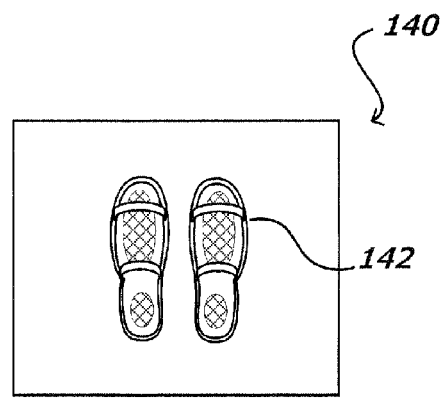
Figure 1F:
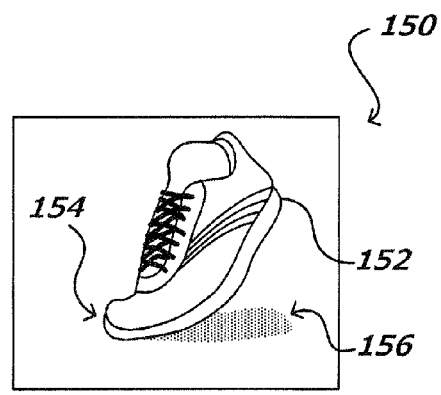

For example, FIG. 1C illustrates an example image 120 of a boot 122 that can be captured in accordance with various embodiments. Even though a user might think the orientation is appropriate, unless the algorithm or image analysis service has a way to determine that the boot image is mirrored with respect to the normal orientation of FIG. 1A, the algorithm might not be able to find a match even if there is matching information for that boot (or a similar boot). Further, the size of the boot can be significantly different than that of a shoe, such that a different scale image or distance might be needed for the matching, but the user would generally have no way of knowing this information. FIG. 1D shows another image 130 of a shoe 132 that can be captured in accordance with various embodiments. As can be seen, the orientation is significantly different than the standard orientation of FIG. 1A. Due to the different orientation, a matching algorithm might not even be able to identify this object as a shoe, let alone determine the particular style. A user might be tempted to take such an image if the user sees a person wearing those shoes or sees them in a display window, without knowing that the matching algorithms may not be able to match objects from that orientation. A similar issue can arise with the shoes 142 of the image 140 of FIG. 1E, in that there are two shoes taken from an orientation similar to how the user would actually wear the shoes. An algorithm might not be able to recognize either object as a shoe, and may or may not be able to determine that these are two related objects that correspond to a single item. A user might take such a view when attempting to locate information about the shoes the user is wearing, for example. Yet another issue is illustrated in FIG. 1F. In this image 150, the shoe 152 is bent such that at least a portion 154 of the shoe has a different shape from a standard shape. Such variation can create difficulties with a matching process. Further, although algorithms can attempt to account for variations in lighting and other such factors, additional objects in the image such as shadows 156, stickers, writing, and the like can potentially affect the matching process by changing the determined shape, coloration, texture, or other such aspect of the object.

Figure 2:
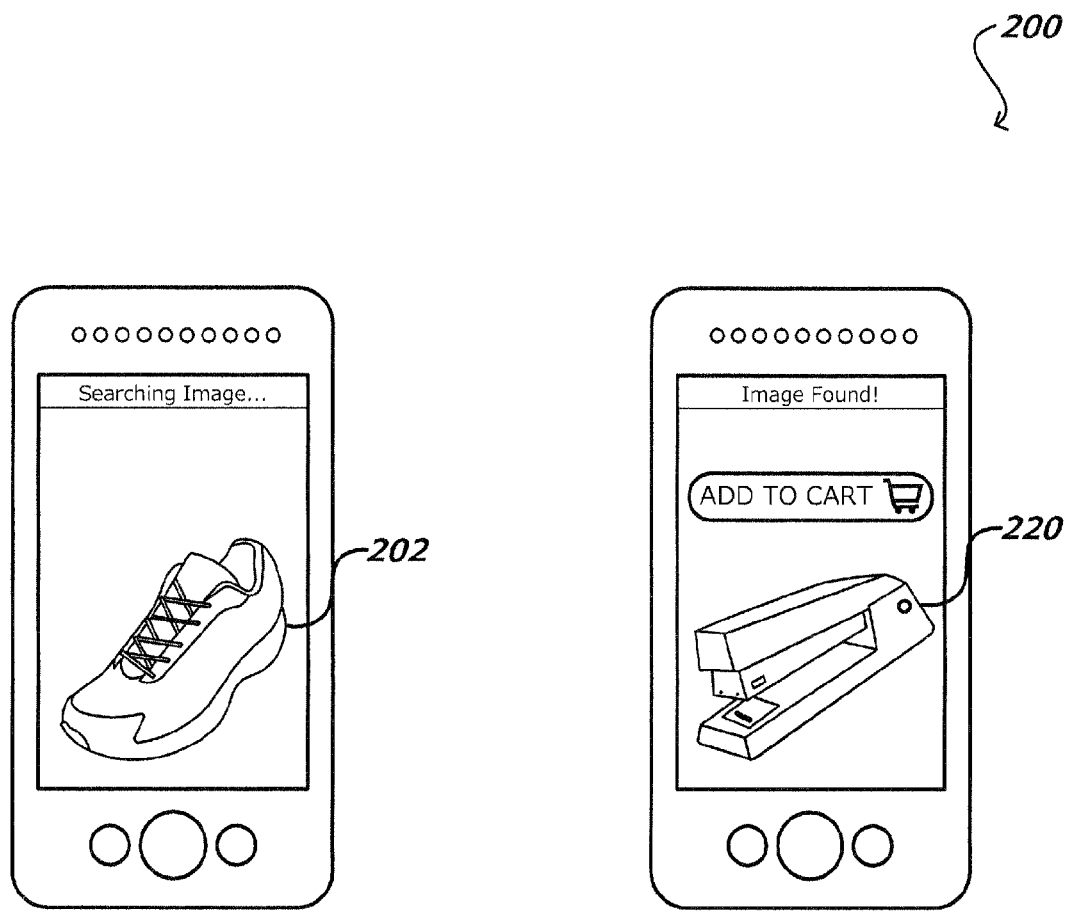
FIG. 2 illustrates an example situation of recognizing an object represented in an image in accordance with various embodiments

Accordingly, the image analysis service may not recognize the object represented in the image and/or may return an incorrect matching, such as an image of stapler 220 when the user captured an image of a shoe 202, as shown example 200 in FIG. 2. Such an error can be frustrating to a user, who may then have to take additional steps to obtain relevant information about the object, such as a link or other information indicating where to purchase the object. Further, such an error can negatively affect the user's confidence in the quality of the image identification software, whereby the user attempts to use other such software to identify the object and obtain relevant information.

Accordingly, in accordance with various embodiments, a computing device can capture images (e.g., live video feed) to be analyzed in order to recognize (i.e., identify, determine, etc.) one or more objects included in the captured images. In some embodiments, an object recognition process (or algorithm) can be utilized, at least in part, to recognize the one or more objects. The object recognition process can use image processing (e.g., edge detection, pixel comparison, etc.) and/or other techniques or approaches in attempt to recognize the objects. In some cases, the object recognition process can be performed on the computing device. In some cases, the device can transmit the captured images to one or more devices (e.g., servers) external to the computing device, where the images are then analyzed using the object recognition process. The device(s) external to computing device (i.e., external device(s), external server(s), etc.) can then transmit information about recognized objects back to the computing device. In some embodiments, the information can include (but not limited to) an identity of an object, a location of an object, a price of an object, etc. Additionally or alternatively, the information can be provided to at least one of an electronic store application, a data retrieval application, or one or more applications (web or device) or services. The applications and/or services can reside on the device, or be in communication with such applications and/or services.

For example, FIGS. 3A, 3B, 3C, and 3D illustrate example processes for locating matches for a shoe based on the sole of the shoe represented in image information in accordance with various embodiments. Matches for a shoe can include, for example, a brand and model of a shoe. For example, as shown in example 300 of FIG. 3A, a user interested in obtaining information about a shoe, such as a make and model of the shoe, a price of the shoe, a description of the shoe, etc. can take an image of a sole of the shoe which can be utilized to identify the shoe. For example, using an appropriate application executing on a computing device, the user is able to obtain images (or video) of the sole of shoe by positioning the computing device such that the shoe is within a field of view of one or more cameras on the computing device. The captured image(s) can be analyzed at the user's device or communicated over a network to remote server for analysis. The remote server can include an image analysis service configured to analyze the image(s) to attempt to identify the shoe based at least in part on the sole of the shoe represented in the captured image(s). The image analysis service can be in communication with an image database, such as a catalog database of product images or other such images that can be used to match against the user captured image.

In accordance with an embodiment, more and more approaches can be utilized in analyzing the images to determine a matching shoe make and model. One such approach can include, for example, identifying a plurality of feature points corresponding to a pattern or other distinguishing features of portions 302 and 304 of the sole of the shoe, such as those represented in example 300 of FIG. 3A. Additional features and processes can be implemented as well. The additional features can include objects or patterns of various shape, size, and color. In some embodiments, image processing processes may include sub-processes such as, for example, thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, and/or counting specific patterns).

In this example, the image of the sole of the shoe can be analyzed to identify regions 306 and 308 that include a representation of the sole of the shoe. A signature representative of the sole of the shoe can be determined according to the pattern of the sole. The pattern of the sole of the shoe can include, for example, spacing between different regions of the sole or other markings or other distinguishing features.

Once the regions that include the representation of the sole of the shoe are identified, a plurality of feature points corresponding to pattern or other distinguishing features are identified. Based at least in part on the feature points, a local image descriptor is computed to capture the image appearance around the interest point using one or more local image descriptor algorithms, such as gradient magnitude/orientation histograms, shape context descriptors, etc. Various feature detection techniques can be used to identify the feature points from the query image. Feature points can include, for example, edges, corners, or ridges of the object represented in the image. In accordance with an embodiment, edges can be points where there is a boundary (or an edge) between two image regions. Example edge detection algorithms include Canny, Sobel, SUSAN, among others. Corners can be point-like features in an image that have a two dimensional structure. Example corner detection algorithms include Shi & Tomasi, Harris, FAST, etc. Ridges can be a one-dimensional curve that represents an axis of symmetry. Feature classifier techniques can include, for example, support vector machine (SVM), Adaboost, and Pyramid match kernel (PMK), etc.

In accordance with an embodiment, the feature descriptors can "describe" elementary characteristics such as the shape, the color, the texture, etc. of the object. Accordingly, a feature descriptor can be computed at any "interesting" part of an image, such as the feature points described above. Example feature descriptors can include maximally stable external regions (MSER), image moments, scale-invariant feature transform (SIFT), accumulated signed gradient (ASG), among others. In some situations, global descriptors can be determined by computing a gradient map of the user obtained image and then generating a gradient orientation template of the whole object. As is described herein, the signature can be compared to stored signatures to identify the type of shoe and provide additional information associated with the shoe.

Figures 3A, 3B:
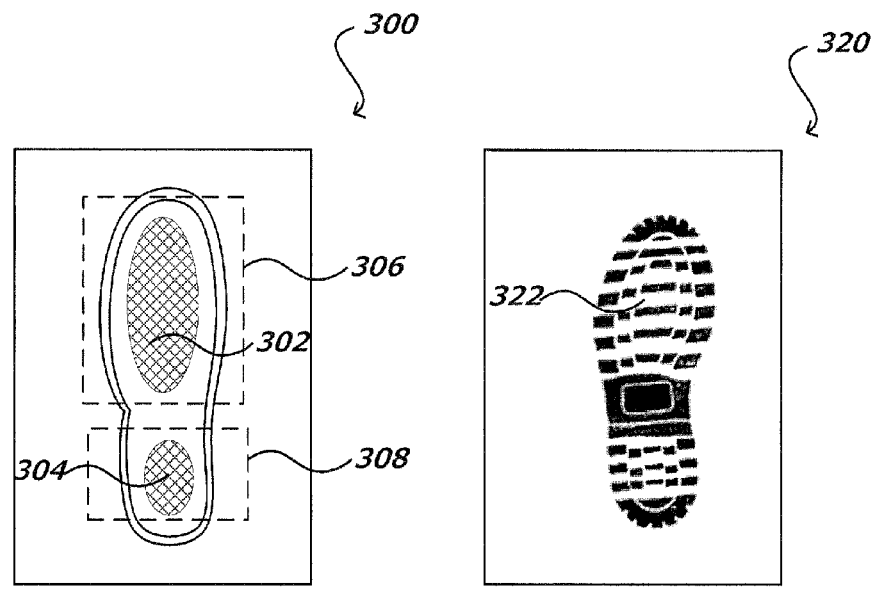
FIGS. 3A, 3B, 3C, and 3D illustrate example processes for finding matches for an object represented in an image that can be utilized that can be utilized in accordance with various embodiments.

FIG. 3B is another example 320 of analyzing an image of a sole of a shoe to determine a make and model of the shoe. It should be noted that a preprocessing stage can first be completed. In the preprocessing stage, a plurality of images can be analyzed to generate information that can be utilized to match information determined from a query image to determine a make and model of a shoe. For example, during the preprocessing stage a plurality of images can be analyzed to determine feature descriptors representative of a sole of a shoe represented in each of the images of the plurality of images. The plurality of images can be images stored in a database. The images can be representative of shoes of different makes and models. Each feature descriptor can be mapped to a codeword, using a codebook. The codebook can be creating using, for example, vector quantization. Codewords can be created for all (and in some situations a portion of) the feature descriptors from all (and in some situations a portion of) the images in the database. The feature descriptors can be indexed in a search engine, database, or other similar system. Each feature of the image can be mapped to a particular codeword in the codebook while the image can be represented by a histogram of the codewords. In some embodiments, the codebook is represented by a forest of trees, leaves of which may represent a plurality of codeword bins. In certain embodiments, each codeword stored in a database can be assigned with a particular weight that is computed according to uniqueness of the corresponding codeword comparing with other codewords in the database.

In accordance with an embodiment, when a query image is received that includes a representation of a sole 322 of a shoe, the image can be analyzed to extract one or more feature points from the image of the sole of the shoe. For at least a portion of the feature points, and in various embodiments all the feature points, a feature descriptor can be computed.

Each feature descriptor from the query image can be mapped to a codeword using the codebook. Images can be represented by a histogram of codewords, wherein each code word can be associated with a feature descriptor. The histogram of code words for the query and database images can be compared and this can be used to create a ranking of the database images which best match the query image. The top ranked images may be further refined using techniques such as Random Sample Consensus (RANSAC). In this approach, RANSAC can be used between each image of the top ranked image and the query image to generate a number of inliers. The comparison that results in the greatest number of inliers can be selected as the matching image, where the matching image is associated with information such as the make and model of the shoe.

Figures 3C, 3D:
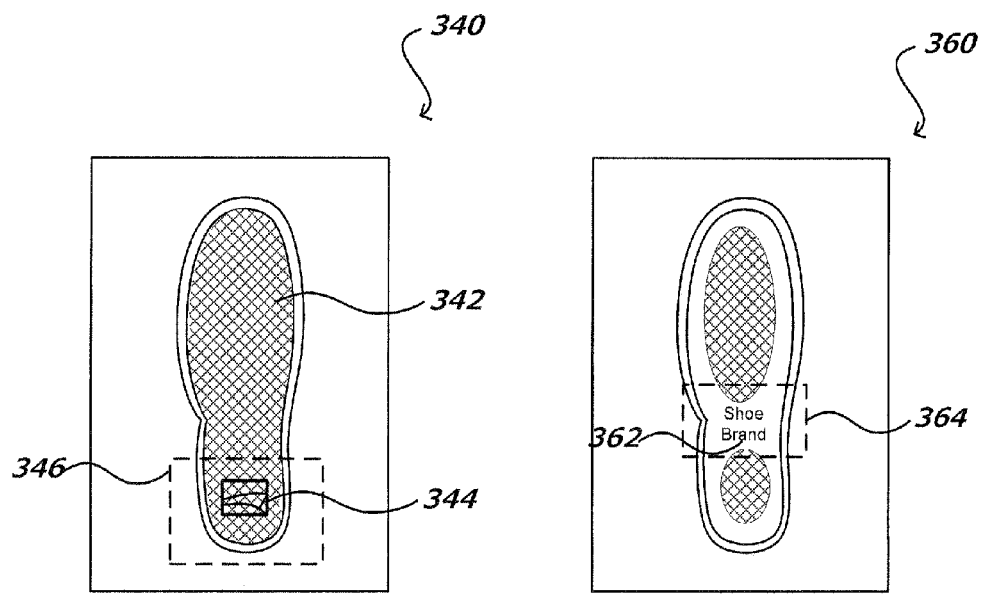

FIG. 3C is another example 340 of analyzing an image of a sole of a shoe to identify the shoe based at least in part on a pattern or other distinguishing features of portions of the sole. In this example, visual semantic information can be identified. Visual semantic information can include, for example, text, logos, brand identifiers, or other distinguishing features or markings. Any detected texts/logos on the object can serve as features to reduce search space and make the system more robust. For example, by detecting the markings 344 in region 346 of the sole 342 of the shoe, the service can identify a shoe brand. This can limit the search space to that particular brand. Thereafter, the service can analyze the image(s) to attempt to identify the shoe based at least in part on the sole of the shoe represented in the captured image(s).

FIG. 3D is yet another example 360 of analyzing an image of a sole of a shoe to identify the shoe based at least in part on a pattern or other distinguishing features of portions of the sole. In this example, various techniques (e.g., OCR and other geometric recognition processes) may also be used as the primary or secondary image and text analysis technique to identify or otherwise verify the type of shoe. For example, optical character recognition (OCR) can be used to identify text, logos, brand identifiers, or other distinguishing features or markings. to reduce search space and make the system more robust. For example, by detecting the shoe brand name 362 in region 364 of the sole of the shoe, the service can identify a shoe brand. This can limit the search space to that particular brand. Thereafter, the service can analyze the image(s) to attempt to identify the shoe based at least in part on the sole of the shoe represented in the captured image(s).

In any situation (e.g., FIGS. 3A, 3B, 3C, 3D), the image analysis service can generate a list potential shoe matches and send back the user's device information associated with a list of similar objects. The information can be displayed to the user on a display element of the user's device. For example, in accordance with an embodiment, the information can be displayed while simultaneously tracking the object in view; i.e., generating an augmented reality view or otherwise providing the information in another format.

Figure 4A:
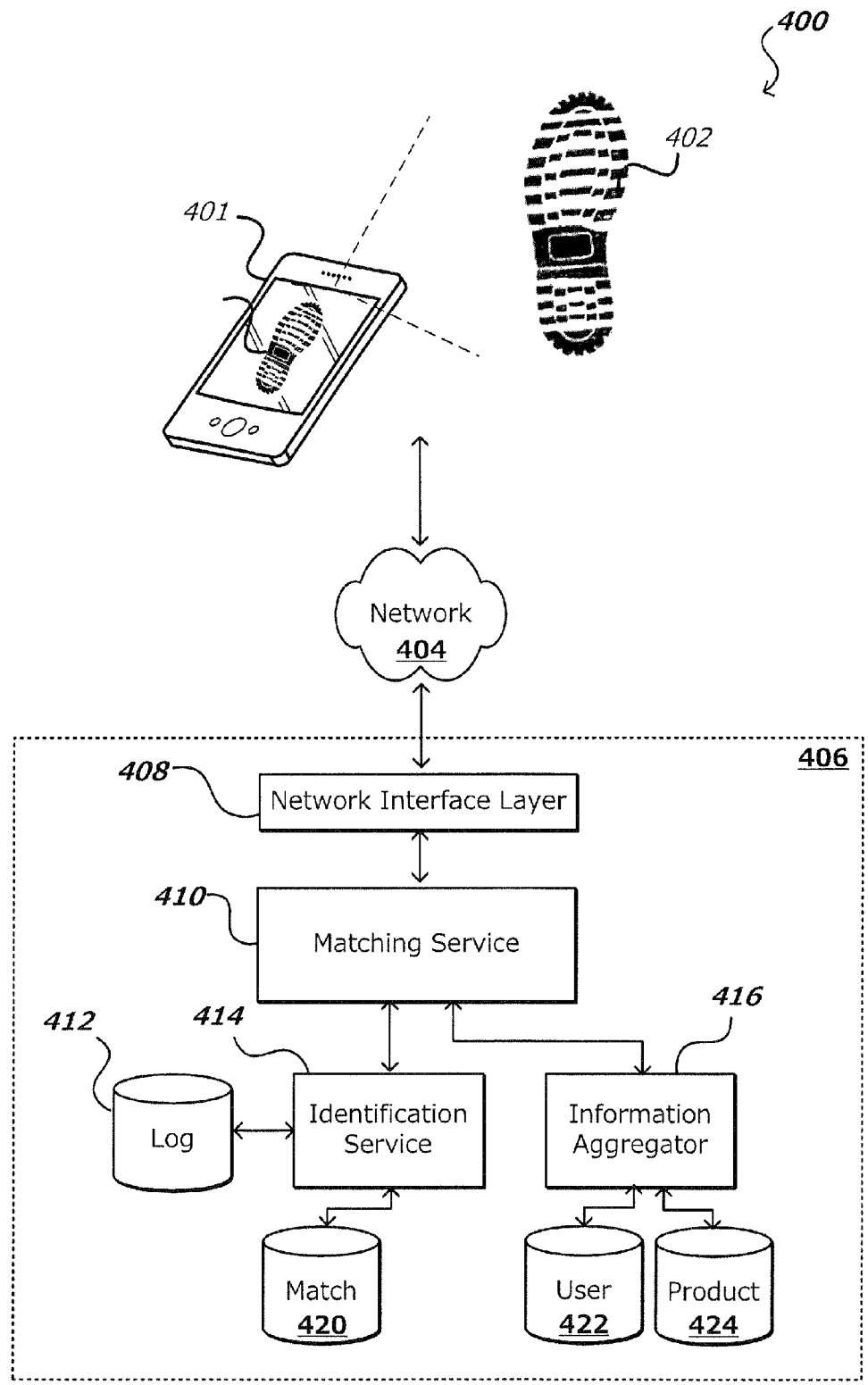
FIGS. 4A and 4B illustrate an example system for identifying items and providing information about those items that can be utilized in accordance with various embodiments.

FIG. 4A illustrates an example environment 400 in which information associated with the object can be located and transferred in accordance with various embodiments. In this example, a user is able to capture one or more types of information using at least one computing device 401. For example, a user can cause a device to capture image (or video) information of a sole of a shoe 402, and can send at least a portion of that image (or video) information across at least one appropriate network 404 to attempt to obtain information for one or more objects, persons, or occurrences within a field of view of the device. In this example, the image information includes a representation of a sole of a shoe and the information can include (but not limited to) an identity of a shoe, a location of where to purchase the shoe, a price of shoe, etc. The network 404 can be any appropriate network, such as may include the Internet, a local area network (LAN), a cellular network, and the like. The request can be sent to an appropriate content provider 406, as may provide one or more services, systems, or applications for processing such requests. The information can be sent by streaming or otherwise transmitting data as soon as it is obtained and/or ready for transmission, or can be sent in batches or through periodic communications. In some embodiments, the computing device can invoke a service when a sufficient amount of image information is obtained in order to obtain a set of results. In other embodiments, image information can be streamed or otherwise transmitted as quickly as possible in order to provide near real-time results to a user of the computing device.

In this example, the request is received to a network interface layer 408 of the content provider 406. The network interface layer can include any appropriate components known or used to receive requests from across a network, such as may include one or more application programming interfaces (APIs) or other such interfaces for receiving such requests. The network interface layer 408 might be owned and operated by the provider, or leveraged by the provider as part of a shared resource or "cloud" offering. The network interface layer can receive and analyze the request, and cause at least a portion of the information in the request to be directed to an appropriate system or service, such as an image analysis service 410 as illustrated in FIG. 4A. An image analysis service in this example includes components operable to receive image information about an object, analyze the image information, and return information relating to people, products, places, or things that are determined to match objects in that image information.

The image analysis service 410 in this example can cause information to be sent to at least one identification service 414, device, system, or module that is operable to analyze the image information and attempt to locate one or more matches for objects reflected in the image information. In at least some embodiments, an identification service 414 will process the received data, such as to extract points of interest or unique features in a captured image, for example, then compare the processed data against data stored in a matching data store 420 or other such location. In other embodiments, the unique feature points, image histograms, or other such information as described in FIGS. 2 and 3 about an image of a sole of a shoe or other object can be generated on the device and uploaded to the image analysis service, such that the identification service can use the processed image information to perform the match without a separate image analysis and feature extraction process. Certain embodiments can support both options, among others. The data in an image matching data store 420 might be indexed and/or processed to facilitate with matching, as is known for such purposes. For example, the data store might include a set of histograms or feature vectors instead of a copy of the images to be used for matching, which can increase the speed and lower the processing requirements of the matching. Approaches for generating image information to use for image matching are well known in the art and as such will not be discussed herein in detail.

The image analysis service 410 can receive information from each contacted identification service 414 as to whether one or more matches could be found with at least a threshold level of confidence, for example, and can receive any appropriate information for a located potential match. The information from each identification service can be analyzed and/or processed by one or more applications of the image analysis service, such as to determine data useful in obtaining information for each of the potential matches to provide to the user. For example, an image analysis service might receive bar codes, product identifiers, or any other types of data from the identification service(s), and might process that data to be provided to a service such as an information aggregator service 416 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 416 can utilize the aggregated data from the image analysis service 410 to attempt to locate products, in a product data store 424 or other such location, which are offered through the marketplace and that match, or are otherwise related to, the potential match information. For example, if the identification service identifies a book in the captured image or video data, the information aggregator can attempt to determine whether there are any versions of that book (physical or electronic) offered through the marketplace, or at least for which information is available through the marketplace. In at least some embodiments, the information aggregator can utilize one or more suggestion algorithms or other such approaches to attempt to determine related elements that might be of interest based on the determined matches, such as a movie or audio tape version of a hook. In some embodiments, the information aggregator can return various types of data (or metadata) to the environmental information service, as may include title information, availability, reviews, and the like. For facial recognition applications, a data aggregator might instead be used that provides data from one or more social networking sites, professional data services, or other such entities. In other embodiments, the information aggregator might instead return information such as a product identifier, uniform resource locator (URL), or other such digital entity enabling a browser or other interface on the client device 402 to obtain information for one or more products, etc. The information aggregator can also utilize the aggregated data to obtain various other types of data as well. Information for located matches also can be stored in a user data store 422 of other such location, which can be used to assist in determining future potential matches or suggestions that might be of interest to the user. Various other types of information can be returned as well within the scope of the various embodiments.

The image analysis service 410 can bundle at least a portion of the information for the potential matches to send to the client as part of one or more messages or responses to the original request. In some embodiments, the information from the identification services might arrive at different times, as different types of information might take longer to analyze, etc. In these cases, the image analysis service might send multiple messages to the client device as the information becomes available. The potential matches located by the various identification services can be written to a log data store 412 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components.

It should be understood that, although the identification services are shown to be part of the provider environment 406 in FIG. 4A, that one or more of these identification services might be operated by third parties that offer these services to the provider. For example, an electronic retailer might offer an application that can be installed on a computing device for identifying music or movies for purchase. When a user transfers a video clip, for example, the provider could forward this information to a third party who has software that specializes in identifying objects from video clips. The provider could then match the results from the third party with items from the retailer's electronic catalog in order to return the intended results to the user as one or more digital entities, or references to something that exists in the digital world. In some embodiments, the third party identification service can be configured to return a digital entity for each match, which might be the same or a digital different digital entity than will be provided by the image analysis service to the client device 402.

Figure 4B:

As described, the image analysis service can generate a list of potential shoe matches and send back to user's device information associated with a list of similar objects. The information can be displayed to the user on a display element of the user's device. For example, as illustrated in example 440 of FIG. 4B, the device 446 displays the matched object to the user and in various embodiments, information associated with the object. The associated information can include any information related to an object, item, product, or other element that is matched (within at least a level of confidence) to the image information. The displayed information in this example includes the name of the located shoe, an image of the shoe (as captured by the user or otherwise obtained), pricing and description information, and review information. Also as shown are options to purchase the shoe.

In accordance with an embodiment, the type of information displayed (or otherwise conveyed) can depend at least in part upon the type of content located or matched. For example, a located shoe might include shoe type and additional images. For facial recognition, the information might include name, title, and contact information. It should be noted that images of any object, scene, person, or otherwise can be acquired, and information related to the subject of the acquired image can be provided. Examples situations in which such information can be provided include, but are not limited to, shopping, exploring, data collecting, where a user captures information about an object and is provided information related to the object; traveling, where a user captures an image of a monument, building, statute, landscape, etc. and is provided information related to the captured image, working, where a user captures an image of a part, component, or tool and is provided information related to the captured image; exploring, where a user captures an image of food, locations and is provided information related to the captured image, among others.

Figure 5A:
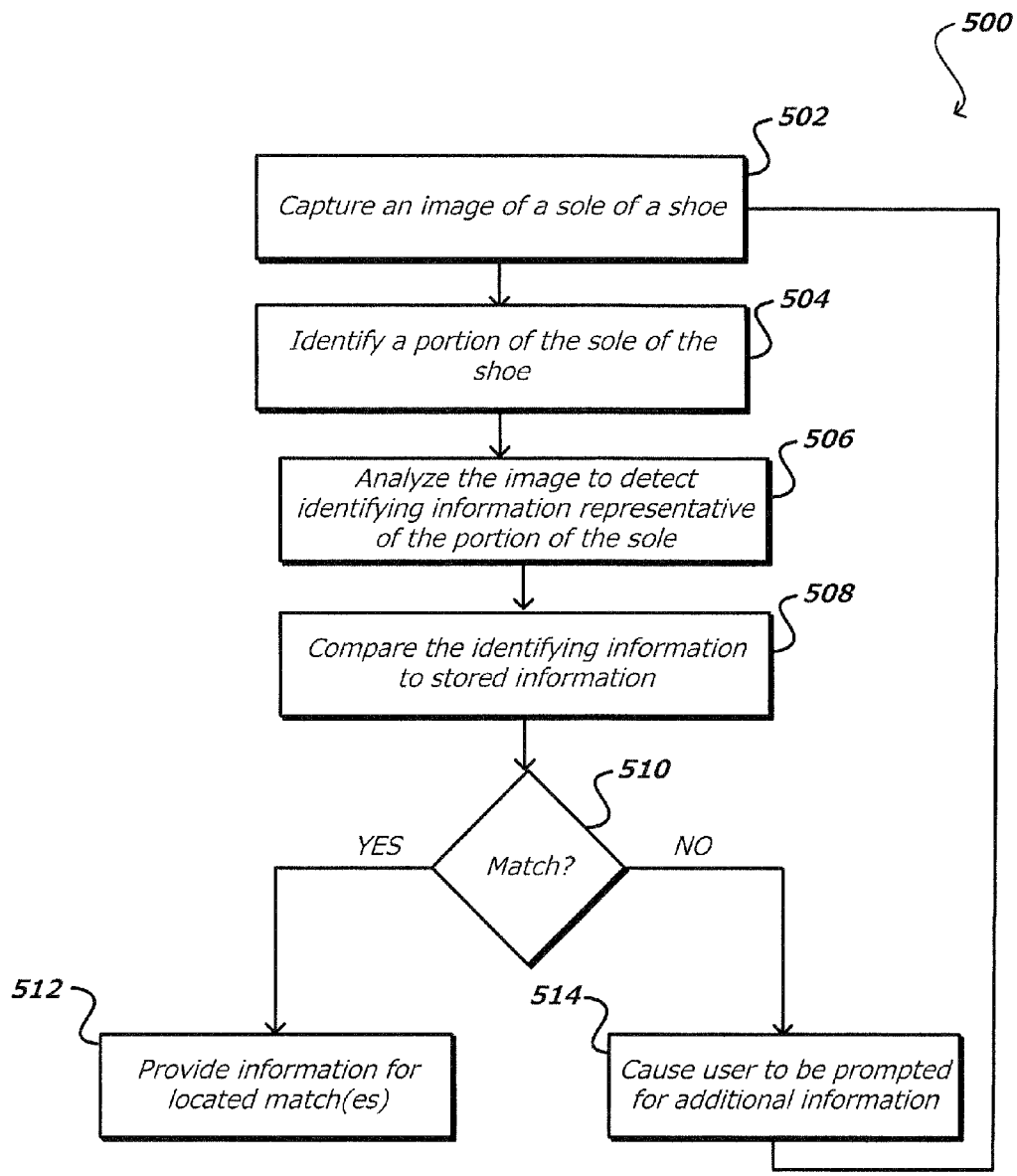
FIGS. 5A, 5B, and 5C illustrate an example process for finding matches for an object represented in an image that can be utilized in accordance with various embodiment.

FIG. 5A illustrates an example process 500 for identifying an object represented in an image in accordance with various embodiments. It should be understood that, for any process discussed herein, there can be additional, fewer, or alternative steps performed in similar or alternative orders, or in parallel, within the scope of the various embodiments unless otherwise stated. In this example, an object identification process or application is activated on a computing device. The identification process can be activated manually by a user, such as by the user opening an application, or automatically by the device in response to a detected motion, location, or other such trigger.

As discussed, an image can be captured manually or automatically, and the image can be analyzed on the device and/or on a remote system or service in communication with the device. An attempt can then be made to match the image, or data about the image, against stored images. As discussed, this can involve an image-to-image comparison, a histogram or feature vector comparison, comparing feature vectors, or any other such process known or used for image matching. For example, a user can capture 502 an image of a sole of a shoe using an electronic device (e.g., a mobile phone, tablet computer, wearable computer, etc.) and the image can be analyzed to identify 504 at least a portion of the sole of the shoe. The service can analyze 506 the portion of the sole to determine one or more features or a signature of the sole of the shoe.

For example, determining the signature can include analyzing the image information to identify a plurality of feature points corresponding to at least one object represented in the image, and based at least in part on the feature points, one or more feature descriptors representative of the sole of the shoe can be generated. In accordance with various embodiments, analyzing the images can include, for example, identifying a plurality of feature points or other identifying information corresponding to pattern or other distinguishing features, and based at least in part on the feature points, one or more feature descriptors representative of the object can be generated. The at least one feature point descriptor can be associated with one or more codewords. A frequency histogram of codewords can be generated by comparing the one or more codewords with a discriminative codebook and used to infer the one or more potential objects in the query image.

The identifying information or the signature can be compared 508 to stored information to determine 510 a match. As described, the stored information can be information representative of different shoes. The stored information can include various signatures in the form of feature points, feature descriptors, images, etc. Comparing the identifying information with the stored information can include analyzing differences between the identifying information and the stored information to identify at least one representative shoe, wherein differences between the identifying information and the stored information is less than a determined matching threshold. The image analysis service can aggregate the results from the image analysis service, and can provide information about the results as a set of matches or results to be displayed to a user in response to a visual search query. The image analysis service can also utilize one or more information aggregators or other such services that are capable of obtaining additional information for each of the results and provide that information to the user. The additional information can include, for example, descriptions, contact information, availability, location data, pricing information, and other such information. Accordingly, information about the match can be provided 512 to the user. For example, information about a type of object contained in the image can be transmitted for display on a display screen of the computing device. The information in this example can include the name of the located shoe, an image of the shoe (as captured by the user or otherwise obtained), pricing and description information, and review information. If at least one match cannot be found with an acceptable level of confidence or other such metric, or if the results otherwise do not meet some predetermined criteria, the device can be caused 514 to prompt the user to capture additional images of the sole of the shoe or for additional information, such as a category, sub-category, type, or other such information about the shoe that might be helpful in locating an appropriate match. The process can continue until an acceptable match is located and/or a user indicates that one of the suggested matches is sufficient. In at least some embodiments, the user will only be prompted for additional information up to a maximum number of times, in order to prevent a degrading of the user experience, etc. As discussed, information for related, similar, or suggested items or objects can be determined and presented as well.

Figure 5B:
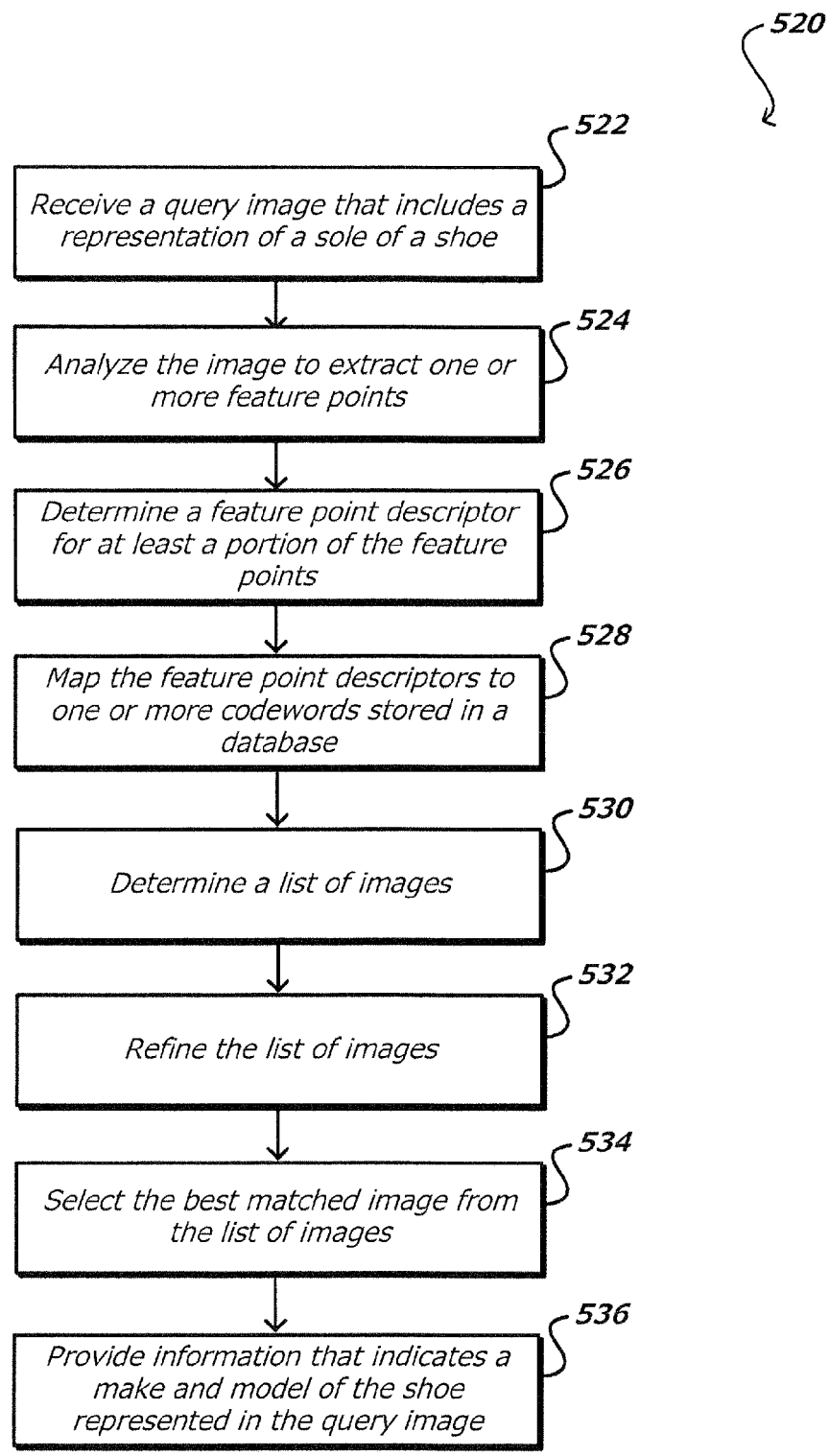

FIG. 5B illustrates an example process 520 for identifying an object represented in an image in accordance with various embodiments. As described in FIG. 5A, one or more approaches can be used to determine aspects of the sole of a shoe that can be used to identify the make and model of the shoe. In this example, a preprocessing stage can first be completed.

In the preprocessing stage, a plurality of images can be analyzed to generate information that can be utilized to match information determined from a query image to determine a make and model of a shoe. For example, during the preprocess stage a plurality of images can be analyzed to determine feature descriptors representative of a sole of a shoe represented in each of the images of the plurality of images. The plurality of images can be images stored in a database. The images can be representative of shoes of different makes and models. The feature descriptors of a particular shoe can be associated with one or more codewords, where each codeword represents one feature and variants of the feature of the image. The codewords can be indexed in a search engine, database, or other similar system. A codebook can be generated based at least upon the database, where the number of distinct codewords can be the size of the codebook. Thus, each feature of the image can be mapped to a particular codeword in the discriminative codebook while the image can be represented by a histogram of the codewords. In some embodiments, the codebook is represented by a forest of tree, leaves of which may represent a plurality of codeword bins. In certain embodiments, each codeword stored in a database can be assigned with a particular weight that is computed according to uniqueness of the corresponding codeword comparing with other codewords in the database.

In accordance with an embodiment, when a query image is received 522 that includes a representation of a sole of a shoe, the image can be analyzed 524 to extract one or more feature points from the image of the sole of the shoe. A feature point descriptor can be determined 526 for each one of (or a portion of) the feature points.

The feature point descriptors can be mapped 528 or otherwise associated with one or more codewords of the codebook. Images can be represented by a histogram of codewords, wherein each code word can be associated with a feature descriptor. The histogram of code words for the query and database images can be compared and this can be used to create a ranking of the database images which best match the query image. One or more potential images, for example a list of images representative of a shoe can be determined 530. In accordance with various embodiments, the images can be ranked. The top ranked images may be further refined 532 using techniques such as Random Sample Consensus (RANSAC). In this approach, RANSAC can be used between each image of the top ranked image and the query image to generate a number of inliers. The comparison that results in the greatest number of inliers can be selected 534 as the matching image, where the matching image is associated with information such as the make and model of the shoe. Thereafter, information about the match can be provided 536 to the user. For example, information about a type of object contained in the image can be transmitted for display on a display screen of the computing device. The information in this example can include the make and model of the shoe represented in the query image, an image of the shoe (as captured by the user or otherwise obtained), pricing and description information, and review information.

Figure 5C:
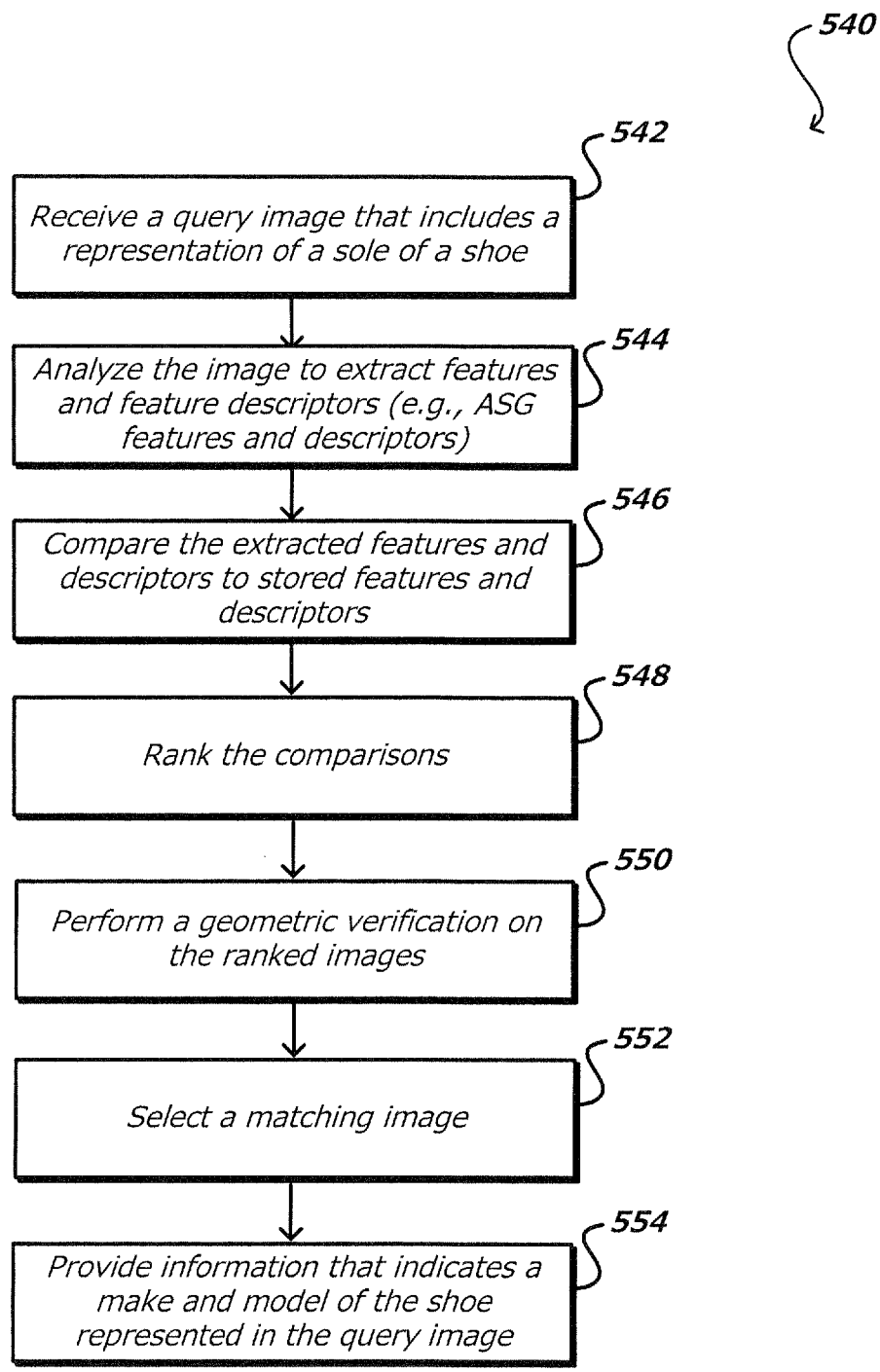

FIG. 5C illustrates an example process 540 for identifying an object represented in an image in accordance with various embodiments. In this example, a query image is received 542 that includes a representation of a sole of a shoe or other piece of footwear (e.g., a sandal). In accordance with various embodiments, for a large class of shoes (e.g. athletic shoes) the soles are very distinctive and have a distinctive pattern. This gives rise to a distinctive image texture in the image. In addition, the soles are planar simplifying the process. By comparing the query picture of the sole of the shoe with a database of sole images one can recognize the image. The picture once recognized may be used to give the user shopping choices by showing the user the shoe, other colors of the shoe or related similar shoes.

For example, the matching or comparison of the query with the database image can be performed using one of a number of image matching technologies. In one such approach, the query image is analyzed 544 to extract feature descriptions (e.g., accumulated signed gradient (ASG) descriptors) and ASG features. The extracted feature descriptors and features are compared 546 to stored features descriptors and features. The comparison can be, for example, a nearest neighborhood comparison or other comparison approach. The result of the comparison can be ranked 548 and geometric verification can be performed 550 on the ranked images. One example approach for performing geometric verification is RANSAC, where using RANSAC determines whether the images satisfy a planar homography. A matching image can be selected 552. As described, the matching image can be associated with information. The information can include, for example, the make and model of the shoe. The information can be provided 554 to the user's device.

In accordance with various embodiments, other approaches for identifying the make and model of a shoe represented in an image can include, for example, fast approximate nearest neighbor. In this approach, the database ASG features can be clustered in to visual words using an artificial neural network tree (ANNT) approach or other similar approach. The visual words from the query can be used to query the inverted file and scored. The score can be used to produce a ranking of the database images with respect to the query. A geometric verification can be performed on the results and a matching image can be selected. Thereafter, information associated with the selected image can be provided to the user's device.

Figure 6:
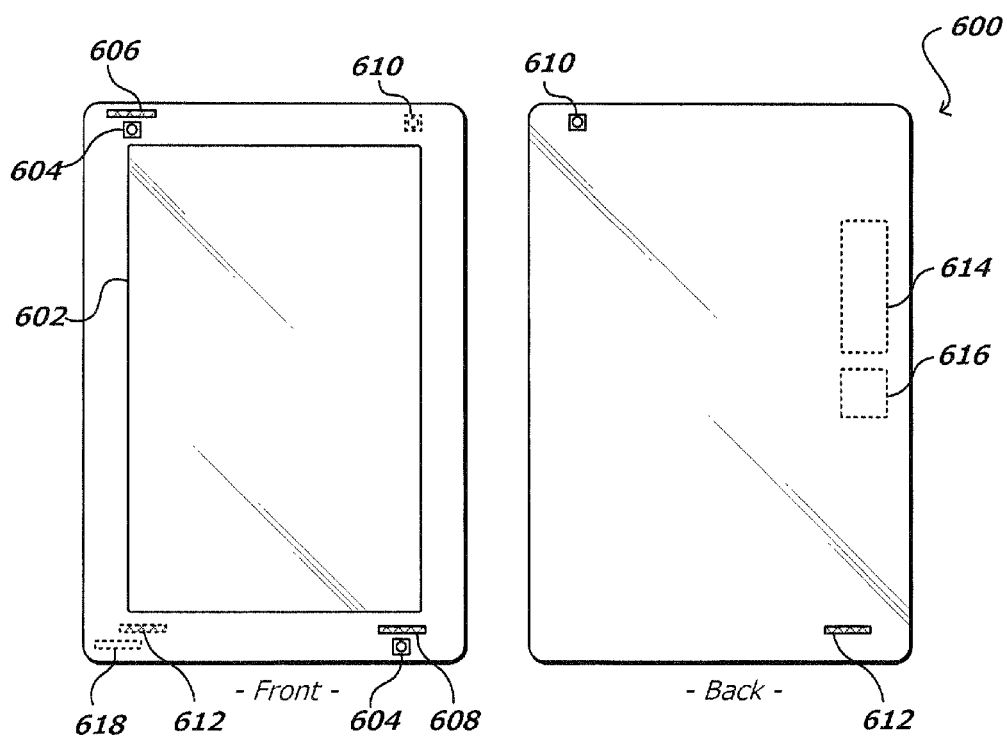
FIG. 6 illustrates an example device that can be used to implement aspects of the various embodiments.

FIG. 6 illustrates front and back views of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
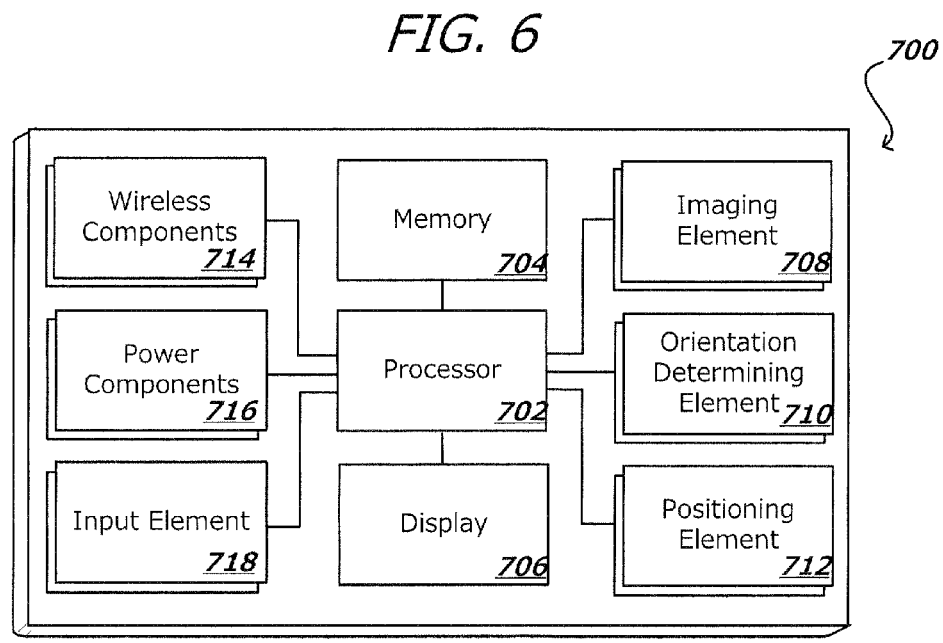
FIG. 7 illustrates example components of a client device such as that illustrated in FIG. 6.
Figure 8:
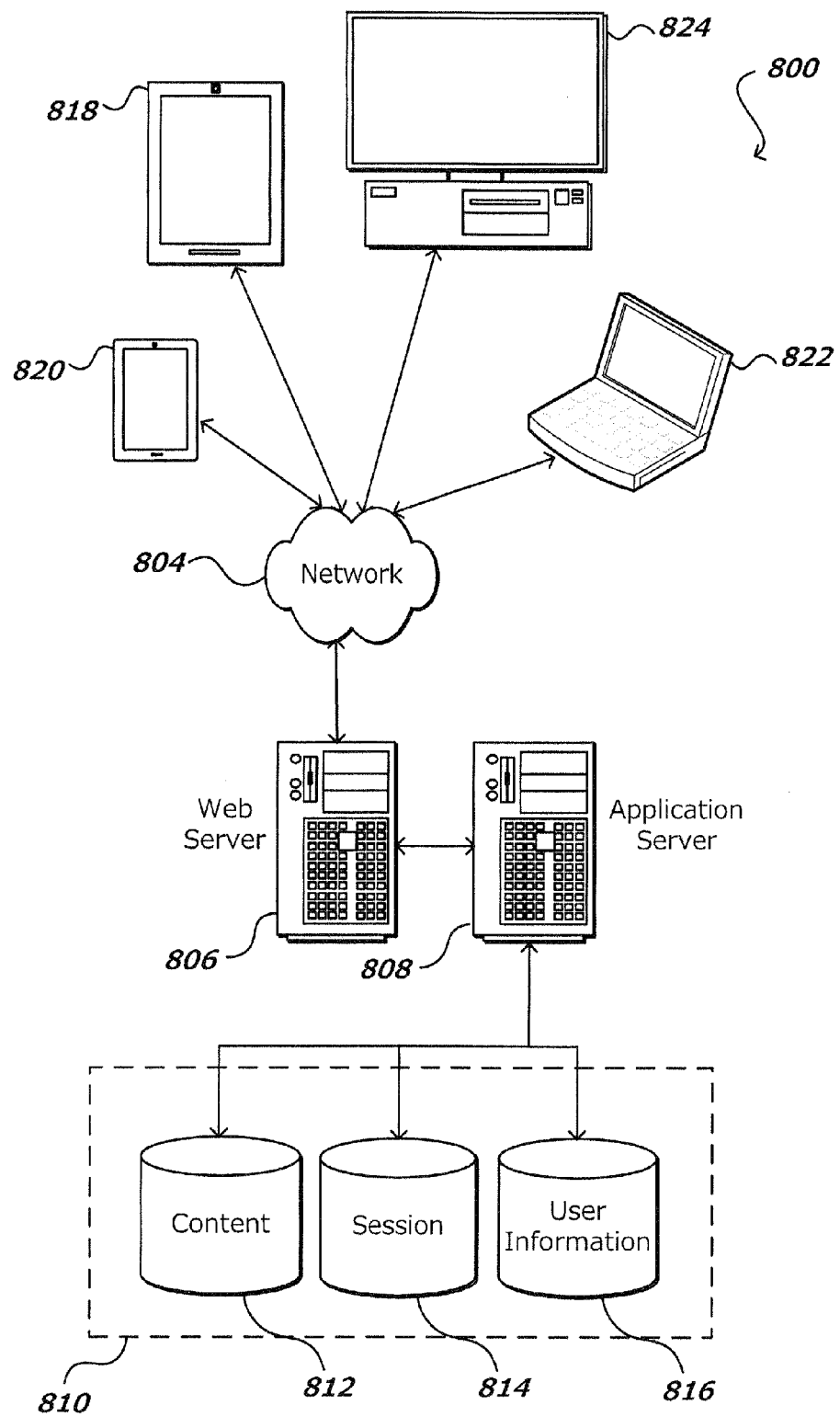
FIG. 8 illustrates an example of an environment for implementing aspects in accordance with various embodiments.

FIG. 7 illustrates a set of basic components of an electronic computing device 700 such as the device 600 described with respect to FIG. 8. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes electronic client devices 818, 820, 822, and 824, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client devices 818, 820, 822, and 824 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 818, 820, 822 and 824. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Pert, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices. each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
a camera configured to capture an image;
at least one processor; and
memory including instructions that, when executed by the at least one processor, cause the computing device to:
receive the image acquired by the camera, the image including a representation of a footwear sole;
analyze the image to determine at least one portion of that image that includes a view of at least a portion of a surface pattern of the footwear sole, the portion of the surface pattern of the footwear sole including repeated surface pattern markings separated by spacing, at least a first portion of the repeated surface pattern markings being located in a toe portion of the footwear sole and a second portion of the repeated surface pattern markings being located in a heel portion of the footwear sole;
determine feature information representative of at least a portion of the pattern or markings;
compare the feature information to stored feature information representative of soles of footwear to determine a shoe type corresponding to the representation of the footwear sole;
determine matching stored feature information with a respective similarity score that at least meets a matching threshold;
identify, based at least in part on the matching feature information, at least one respective type of footwear represented in the image; and
provide, for display on the computing device, at least one of a description, contact information, availability, location data, or pricing information of the respective type of footwear.

2. The computing device of claim 1, wherein the instructions when executed to determine matching stored feature information further cause the computing device to:
determine a distinctive score for the feature information;
identify stored feature information with a distinctive score that meets or exceeds at least a distinctive score threshold; and
determine that the distinctive score for the feature information is greater than other distinctive scores.

3. The computing device of claim 1, wherein the instructions when executed to compare the feature information further cause the computing device to:
analyze differences between the feature information and the stored feature information to identify at least one representative type of footwear, and wherein differences between the feature information and the stored feature information are less than a determined matching threshold.

4. A computing device, comprising:
a camera configured to capture an image;
at least one processor; and
memory including instructions that, when executed by the at least one processor, cause the computing device to:
receive the image acquired by the camera, the image including a representation of a surface pattern on a portion of a footwear, wherein the surface pattern comprises repeated markings separated by spacing, a least a first portion of the repeated surface pattern markings being located in a toe portion of the footwear and a second portion of the repeated surface pattern markings being located in a heel portion of the footwear;
analyze the image to determine at least one feature representative of a portion of the pattern;
compare the at least one feature to stored information to determine a type of footwear represented in the image;
identify, based at least in part on matching feature information to stored feature information, at least one respective type of footwear represented in the image; and
provide on a display of the computing device, in response to receiving the image, the identified at least one respective type of footwear for a user action.

5. The computing device of claim 4, wherein the instructions when executed to analyze the image further cause the computing device to:
extract at least one feature point;
determine a feature descriptor based at least in part on the at least one feature point; and
determine a mapping of the feature descriptor to one or more code words.

6. The computing device of claim 5, wherein the instructions when executed further cause the computing device to:
determine a list of images from a plurality of images stored in a database;
compare a portion of images from the list of images to the image acquired by the camera using Random Sample Consensus (RANSAC); and select a footwear image from the portion of the images that matches the image by at least a threshold amount, the footwear image including the at least one respective type of footwear.

7. The computing device of claim 4, wherein the instructions when executed to analyze the image further cause the computing device to:
analyze a plurality of images stored in a database to extract at least one feature point from at least a portion of the plurality of images, the plurality of images including a representation of a shoe;
generate a feature point descriptor for at least one feature point from the portion of the plurality of images;
convert the feature point descriptor into one or more codewords; and
generate a codebook based at least upon the one or more codewords.

8. The computing device of claim 7, wherein the one or more codewords represent a particular appearance of the pattern on a sole of the shoe, and the one or more codewords are stored in a database that includes at least one codeword converted from corresponding feature point descriptors that represent another appearance of the pattern on the shoe, the another appearance being different from the particular appearance.

9. The computing device of claim 4, wherein the instructions when executed to analyze the image further cause the computing device to:
analyze one or more intensity gradients of a region in the image to identify one or more potential edge locations, the image including pixel values for a plurality of pixels;
analyze pixel values for a set of pixels within a determined distance of the one or more potential edge locations;
determine a character pixel value threshold for the region based at least in part upon the pixel values within the determined distance of each of the one or more potential edge locations; and
determine one or more character portions based at least in part upon a portion of the set of pixels having a pixel value at least meeting the character pixel value threshold.

10. The computing device of claim 9, wherein the instructions when executed to analyze the image further cause the computing device to:
analyze the one or more character portions using a character recognition algorithm to recognize at least one character associated with the one or more character portions,
wherein the at least one character is utilized to identity a particular footwear from a plurality of footwear.

11. The computing device of claim 4, wherein the instructions when executed to analyze the image further cause the computing device to:
provide identifying information to the computing device, wherein the identifying information includes at least one of a name of the at least one respective type of footwear, a description of physical characteristics associated with the at least one respective type of footwear, pricing information associated with the at least one respective type of footwear, history information associated with the at least one respective type of footwear, or a reference to one or more resources for information associated with the at least one respective type of footwear.

12. The computing device of claim 4, wherein the instructions when executed to analyze the image further cause the computing device to:
analyze differences between the at least one feature and the stored information to identify at least one representative type of footwear, and wherein differences between the at least one feature and the stored information are less than a determined matching threshold.

13. The computing device of claim 4, wherein the instructions when executed to analyze the image further cause the computing device to:
determine a distinctive score for the at least one feature;
identify stored information with a distinctive score that meets or exceeds at least a distinctive score threshold; and
determine that the distinctive score for the at least one feature is greater than other distinctive scores.

14. The computing device of claim 4, wherein the pattern includes a spacing between different regions of a sole of the footwear, an arrangement of the markings, a distance between the markings, or a number of the markings.

15. The computing device of claim 4, wherein a sole of the footwear further includes at least one of a logo, text, pattern, colors, or art.

16. A method, comprising:
receiving an image acquired by a camera of a computing device, the image including a representation of a surface pattern on a portion of a shoe, wherein the surface pattern comprises repeated markings separated by spacing, at least a first portion of the repeated surface pattern markings being located in a toe portion of the shoe and a second portion of the repeated surface pattern markings being located in a heel portion of the shoe;
analyzing the image to determine at least one feature representative of a portion of the pattern;
comparing the at least one feature to stored information to determine a type of shoe represented in the image;
identifying, based at least in part on matching feature information to stored feature information, at least one respective type of footwear represented in the image; and
providing on a display of the computing device, in response to receiving the image, the identified at least one respective type of footwear for a user action.

17. The method of claim 16, further comprising:
extracting at least one feature point;
determining a feature descriptor based at least in part on the at least one feature point; and
determining a mapping of the feature descriptor to one or more code words,
wherein at least one of a Harris corner detection algorithm, a FAST corner detection algorithm a scale-invariant feature transform (SIFT) algorithm, a speeded up robust feature (SURF) algorithm, an accumulated signal gradient (ASG) algorithm, a gradient location and orientation histogram algorithm, or a rotation-invariant feature transform (RIFT) algorithm is used to extract the at least one feature point or feature point descriptor.

18. The method of claim 16, further comprising:
analyzing a plurality of images stored in a database to extract at least one feature point from at least a portion of the plurality of images, the plurality of images including a representation of a shoe;

generating a feature point descriptor for at least one feature point from the portion of the plurality of images;

converting the feature point descriptor into one or more codewords; and generating a codebook based at least upon the one or more codewords, wherein the one or more codewords represent a particular appearance of the pattern on the shoe, and the one or more codewords are stored in a database that includes at least one codeword converted from corresponding feature point descriptors that represent another appearance of the pattern on the shoe, the another appearance being different from the particular appearance.

19. The method of claim 16, further comprising:

analyzing one or more intensity gradients of a region in the image to identify one or more potential edge locations, the image including pixel values for a plurality of pixels;

analyzing pixel values for a set of pixels within a determined distance of the one or more potential edge locations;

determining a character pixel value threshold for the region based at least in part upon the pixel values within the determined distance of each of the one or more potential edge locations; and determining one or more character portions based at least in part upon a portion of the set of pixels having a pixel value at least meeting the character pixel value threshold.

20. The method of claim 16, wherein the pattern includes a spacing between different regions of a sole of the shoe, an arrangement of the markings, a distance between the markings, or a number of the markings, and wherein the sole of the shoe further includes at least one of a logo, text, pattern, colors, or art.

* * * * *